United States Patent Office 3,014,761
Patented Dec. 26, 1961

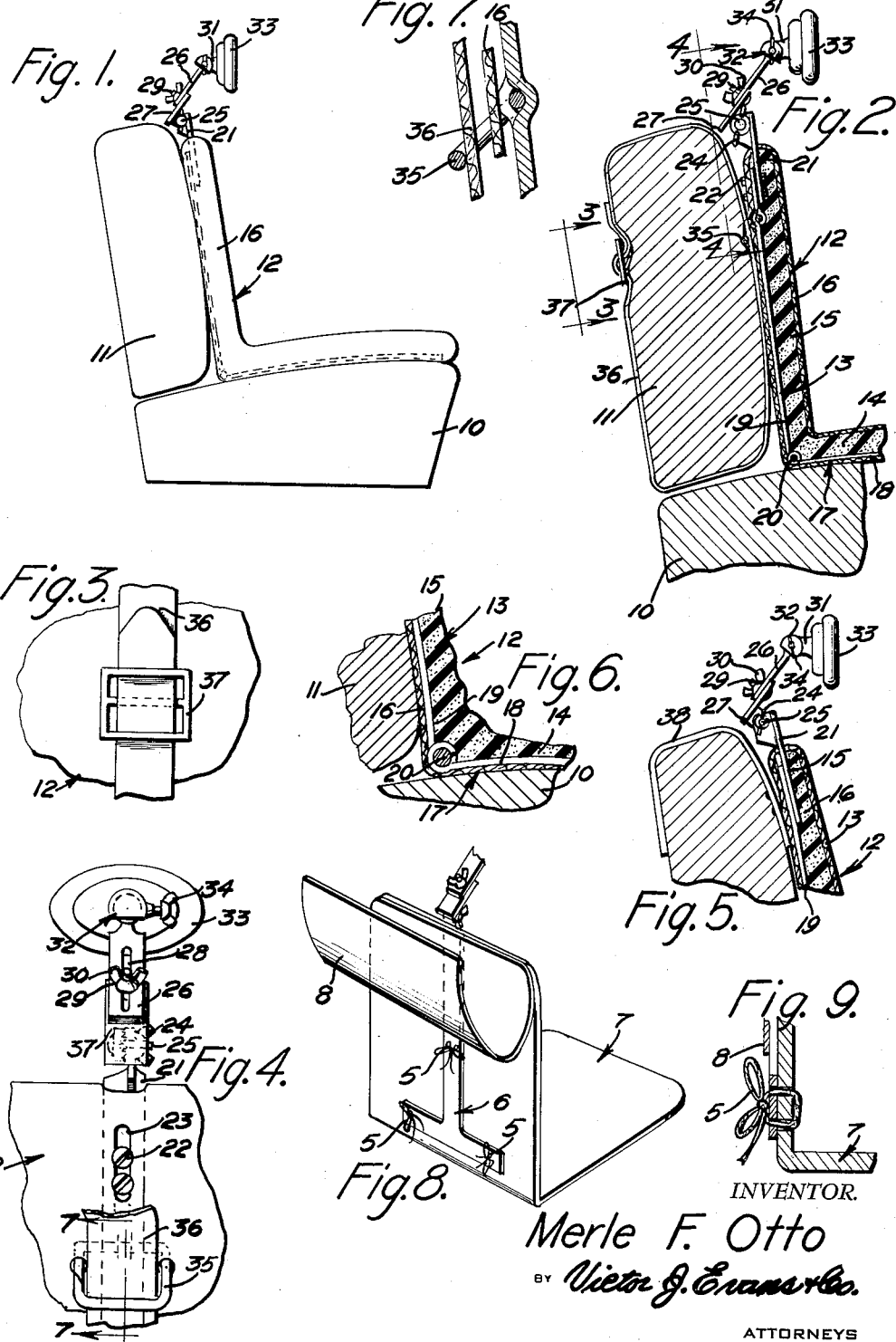

3,014,761
ADJUSTABLE AND REMOVABLE HEAD, NECK, SEAT AND BACK REST COMBINED
Merle F. Otto, P.O. Box 515, Trona, Calif.
Filed Dec. 19, 1958, Ser. No. 781,713
4 Claims. (Cl. 297—230)

This invention relates to a head rest, and more particularly to a head rest assembly for a vehicle seat and back rest.

The object of the invention is to provide a head rest which is adapted to be suitably supported contiguous to a vehicle seat and back rest so that a person driving or sitting in a vehicle will be able to have his or her head supported in a more comfortable and safe manner so that the vehicle can be driven in more comfortably and with greater safety.

Another object of the invention is to provide a head rest assembly for use with a vehicle seat, wherein the head rest assembly can be conveniently adjusted to comfortably engage a person's head or neck, and wherein when the device is not needed the same can be readily detached and collapsed so that it will occupy a minimum amount of space for storage or shipment.

A further object of the invention is to provide an adjustable head rest for a vehicle which is extremely simple and inexpensive to manufacture.

Other objects and advantages will be apparent during the course of the following description.

In the accompanying drawings, forming a part of this application, and in which like numerals are used to designate like parts throughout the same.

FIGURE 1 is a side elevational view illustrating the adjustable head rest of the present invention and showing the device on a vehicle seat.

FIGURE 2 is a vertical sectional view taken through the present invention and showing a strap for maintaining the device fastened to the back rest of the vehicle.

FIGURE 3 is a sectional view taken on the line 3—3 of FIGURE 2.

FIGURE 4 is a sectional view taken on the line 4—4 of FIGURE 2.

FIGURE 5 is a fragmentary sectional view illustrating a modification.

FIGURE 6 is a fragmentary sectional view illustrating a hinge joint.

FIGURE 7 is a sectional view taken on the line 7—7 of FIGURE 4.

FIGURE 8 is a perspective view illustrating certain constructional details.

FIGURE 9 is a fragmentary sectional view showing part of the apparatus of FIGURE 8.

Referring in detail to the drawings, the numeral 10 indicates a vehicle seat such as the front seat of an automobile, while the numeral 11 indicates the usual back rest, and the numeral 12 indicates the assembly of the present invention which is shown to comprise a resilient cushion 13 that may be made of any suitable material such as foam rubber or a wire or similar material for coolness. The cushion 13 includes a horizontally disposed portion 14 and a vertically disposed portion 15, and a cover 16 surrounds the cushion 13.

There is further provided a support member which is indicated generally by the numeral 17, and the support member 17 includes a horizontally disposed base piece 18 as well as a vertically disposed upstanding back member 19, and the back member 19 is pivotally or hingedly connected to the base piece 18 by means of a hinge 20.

The numeral 21 indicates an arm which is adjustably connected to the upper end of the back member 19 as for example by means of screws 22 which extend through a slot 23, FIGURE 4. The numeral 27 indicates a body member which is pivotally connected to the arm 21 by means of a pivot bolt 25, and a wing nut 24 is arranged in threaded engagement with the bolt 25. A shank 26 is adjustably connected to the body member 27, and the shank 26 is provided with a slot 28 through which extends a bolt 29, there being a wing nut 30 on the bolt 29. The numeral 31 indicates a bracket which is adjustably connected to the shank 26 by means of a ball and socket or similar joint 32, and the bracket 31 has a head rest 33 secured thereto. The ball and socket joint 32 is provided with an adjustable screw member 34 which permits the head rest 33 to be moved to different desired locations.

The numeral 35 indicates a ring which is connected to the cover 16, and a strap 36 extends through the ring 35 and surrounds the back rest 11, there being an adjusting buckle 37 arranged in engagement with the strap 36.

Instead of using the strap 36, a clamp such as the clamp 38 of FIGURE 5 can be used, and the clamp 38 can be secured to the assembly 12 in any suitable manner, as for example by means of rivets, screws or the like.

As shown in FIGURE 7 the ring 35 is adapted to be fastened in place by a suitable securing element such as U-bolt 39 or looped over arm 21.

From the foregoing, it is apparent that there has been provided a device which is adapted to be used in a vehicle whereby a person can comfortably and conveniently rest his or her head on the member 33. In use, with the parts arranged as shown in the drawings, it will be seen that for example as shown in FIGURE 1 the member 12 can be arranged contiguous to the seat 10 and back rest of the vehicle, the back rest being indicated by the numeral 11. The bolts 29 and 25 can be loosened so as to permit the head rest 33 to be moved to the proper or desired location so that for example a person driving the vehicle or sitting in the vehicle can rest his or her head against the head rest 33. Thus, in case of an accident a safe support will be provided for the person's head, and also while driving it is possible to support the head in a more comfortable manner. As shown in FIGURE 1 the device 12 may be permitted to rest against the back rest 11 and seat 10. Or, as shown in FIGURE 2 the strap 36 may be used for fastening the assembly 12 to the back rest 11. When the strap 36 is being used, it is extended through the ring 35 which is fastened in place by the securing element 39, FIGURE 7 or looped around arm 21. The buckle 37 can be used for tightening or loosening the strap 36.

An alternative fastening means is illustrated in FIGURE 5 wherein a substantially U-shaped clamp 38 is fastened in place to the member 12, and the clamp 38 is adapted to straddle or engage the upper portion of the back rest 11.

It is noted that the head rest 33 is secured to the bracket 31, and the bracket 13 is adjustably connected to the shank 26 by means of the ball and socket joint 32 or a similar joint. By loosening the screw member 34 pivotal movement about the ball and socket joint 32 is permissible or possible, and then after the parts have been adjusted to the desired position the screw member 34 can be readily tightened. Furthermore, by loosening the nut 30, the shank 26 can be slid or adjusted relative to the member 27, and then the nut 30 can be tightened. Also, the nut 24 can be loosened so as to permit pivotal movement of the member 27 with respect to the member 21 and then the nut 24 can be tightened. A further adjustment is possible due to the provision of the securing elements 22 which extend through the slot 23. These various adjustments permit the head rest 33 to be readily moved to the desired or comfortable position which is required or desired, and after the head rest 33 has been moved to the desired location the various parts can be tightened so as to prevent accidental shifting or movement thereof.

The device is further constructed so that when it is not being used, the portion 15 and portion 14 can be folded together due to the provision of the hinge 20 so that the device will occupy a minimum amount of space for storage or shipment.

The parts can be made of any suitable material and in different shapes or sizes.

The amount of framework being used may be varied as desired. The head rest 33 may be made of cushion-like material. As previously described the covering 16 may be provided, and the covering may be made of any suitable material. The entire device can be readily removed from the vehicle seat when it is not being used.

Thus, it will be seen that there has been provided a safety adjustable head rest which is arranged in a removable combined seat and back rest for automobiles and chairs. The device is especially suitable as a head rest for a person riding or driving in a vehicle and it serves to protect the rider or driver of a car from serious neck or back injuries when a car is hit in the rear since it prevents a person's head from being snapped backwards. It can also be adjusted so as to permit a person to recline while riding as a passenger in a vehicle. It is adjustable for height, as well as for side and angular positions so that it will provide the rider with maximum comfort. The head rest will ride with the body when the body is bouncing when going over rough roads, and the head rest can be made porous for coolness or it can be made of a soft material. The person sitting on the seat holds the head rest in place. In addition to providing a safety advantage, the device also makes the ride more comfortable and relaxing by providing a support for the head.

The device can either be used in the position of FIGURE 1, or else it can be held in place by an arrangement such as the strap 36 or clamp 38. The clamp 38 is constructed so that it conforms to the contour of the back rest 11. The device will readily conform to the angle between the back rest 11 and seat 10 due to the hinge 20. When using an arrangement such as that shown in FIGURE 2, the device can move up and down without any restrictions. The member 38 is constructed of a material that can be readily bent to fit the contour of the vehicle seat or an adjustable clamp can be used.

Referring now to FIGURES 8 and 9 of the drawings, the numeral 8 indicates a member made of felt or the like, and the numeral 7 indicates a seat member, while the numeral 6 indicates a bar which can be fastened in place by means of cord, string or the like as indicated by the numeral 5.

Thus, as shown in FIGURES 8 and 9, felt 8 or any other material can be used for protecting the back of the automobile seat from being chafed with the metal head rest frame. Suitably openings are made in the frame to accommodate fasteners. String, ties, snaps, hooks, and screws or the like such as indicated by the numeral 5 can be used for fastening the head rest frame to the back of the seat. The head rest frame can be installed so it can be removed and placed on another seat and back rest when the seat and back rest are worn out.

In certain instances two vertical arms may be used, and the ring may be made rectangular as desired. Also, the head rest frame can be made detachable from the seat and back rest so that when the seat and back rest are worn out they can be replaced if need be without the customer having to purchase a new head rest and frame and this is optional.

The back member or members, arm or arms, bracket, or brackets, shank or shanks with ring and head rest can be made detachable from the seat and back rest. This is possible so that the seat and back rest can be replaced when they are worn out and this can be accomplished by being attached to the back of the seat with hooks, snaps, screws, cord or the like. Since the head rest is attached to the back rest and seat, the head rest can ride with the body movements when going over rough roads.

It is not absolutely essential to use a U-shaped bolt. Under certain conditions the U-bolt may have a tendency to make a decided bulge in the cushion and it of course only serves the purpose of holding the seat in place with the use of a strap through the ring. Thus, a bolt or similar device can be used for the same purpose of holding the seat in place with the use of a strap through the ring or rings.

Minor changes in shape, size and rearrangement of details coming within the field of invention claimed may be resorted to in actual practice, if desired.

I claim:

1. In a device of the character described, in combination with a vehicle seat and a back rest, a resilient cushion including a horizontally disposed portion and a vertical disposed portion, a cover surrounding said cushion, a support member positioned between said portions of said cushion and said cover and said support member including a horizontally disposed base and at least one vertically disposed upstanding back member, at least one arm adjustably connected to the upper end of said back member, a body member pivotally connected to said arm, a shank adjustably connected to said body member, a bracket adjustably connected to said shank, and a head rest secured to said bracket.

2. The structure as defined in claim 1, and further including a ring connected to said cover, a strap connected to said ring and surrounding said back rest, and said strap being provided with an adjustable buckle assembly.

3. In a device of the character described, a resilient cushion including a horizontally disposed portion and a vertically disposed portion, a cover surrounding said cushion, a support member positioned between said portions of said cushion and said cover and said support member including a horizontally disposed base piece and at least one vertically disposed upstanding back member, at least one arm adjustably connected to the upper end of said back member, a body member pivotally connected to said arm, a shank adjustably connected to said body member, a bracket adjustably connected to said shank, a head rest secured to said bracket, a ring connected to said cover secured in place contiguous to said cover, and a strap connected to said ring and provided with an adjustable buckle assembly.

4. In a vehicle of the type including a seat and a back rest, a resilient cushion including a horizontally disposed portion arranged contiguous to said seat, a vertically disposed portion arranged contiguous to said back rest, a cover surrounding said cushion, a support member positioned between said portions of said cushion and said cover embodying a horizontally disposed base and at least one vertically disposed upstanding back member, said back member being hingedly connected to the base piece, at least one arm adjustably connected to the upper end of said back member, a body member pivotally connected to said arm, a shank adjustably connected to said body member, a bracket contiguous to said shank, means adjustably connecting said bracket to said shank and said means comprising a ball and socket joint which is provided with an adjustable screw member, a head rest fastened to said bracket, a ring connected to said cover, a strap fastened to said ring and surrounding said back rest, and said strap being provided with an adjustable buckle assembly, whereby said cushion and head rest are secured firmly to said back rest.

References Cited in the file of this patent

UNITED STATES PATENTS

| | | |
|---|---|---|
| 633,012 | Kidd et al. | Sept. 12, 1899 |
| 2,307,331 | Parker | Jan. 5, 1943 |
| 2,587,194 | Mitchell | Feb. 26, 1952 |
| 2,632,497 | Brady | Mar. 24, 1953 |
| 2,661,050 | Felter | Dec. 1, 1953 |
| 2,666,476 | Lycan | Jan. 19, 1954 |
| 2,756,808 | Eichorst | July 31, 1956 |
| 2,884,991 | Bloomquist | May 5, 1959 |

FOREIGN PATENTS

| | | |
|---|---|---|
| 792,723 | Great Britain | Apr. 2, 1958 |